(12) United States Patent
Uemura et al.

(10) Patent No.: US 8,835,830 B2
(45) Date of Patent: Sep. 16, 2014

(54) VOLTAGE OUTPUT CIRCUIT, CONNECTOR MODULE, AND ACTIVE CABLE

(75) Inventors: Hiroshi Uemura, Yokohama (JP); Ippei Akita, Toyohashi (JP); Tetsuro Itakura, Tokyo (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 418 days.

(21) Appl. No.: 13/308,646

(22) Filed: Dec. 1, 2011

(65) Prior Publication Data

US 2012/0241599 A1 Sep. 27, 2012

(30) Foreign Application Priority Data

Mar. 23, 2011 (JP) ................ 2011-065021

(51) Int. Cl.
  *H01J 40/12* (2006.01)
  *H04B 10/25* (2013.01)
  *H04B 10/69* (2013.01)
(52) U.S. Cl.
  CPC ............... *H04B 10/69* (2013.01); *H04B 10/25* (2013.01)
  USPC ...................................... 250/214.1
(58) Field of Classification Search
  USPC ............................ 250/214.1, 214 R; 330/308
  See application file for complete search history.

(56) References Cited

U.S. PATENT DOCUMENTS

| | | | | |
|---|---|---|---|---|
| 2004/0251969 A1* | 12/2004 | Abidin et al. | ............... | 330/308 |
| 2006/0202766 A1* | 9/2006 | Kwa et al. | ............... | 330/308 |
| 2010/0086315 A1* | 4/2010 | Tanaka | ............... | 398/208 |
| 2011/0181254 A1* | 7/2011 | Ritter et al. | ............... | 323/234 |

FOREIGN PATENT DOCUMENTS

| | | |
|---|---|---|
| JP | 2000-174567 | 6/2000 |
| JP | 2003-283266 A | 10/2003 |
| JP | 2009-071608 A | 4/2009 |
| JP | 2010-178256 A | 8/2010 |
| JP | 2010-193229 A | 9/2010 |
| JP | 2010-276853 A | 12/2010 |

OTHER PUBLICATIONS

Japanese Office Action mailed on Nov. 19, 2013 in corresponding Japanese Application No. 2011-065021, along with English translation thereof.
Japanese Office Action mailed May 28, 2013 in corresponding JP Application No. 2011-065021 along with English translation.
Kromer, C., et al., "A 100-mW 4×10Gb/s Transceiver in 80-nm CMOS for High-Density Optical Interconnects", IEEE Journal, Solid-State Circuits, vol. 40, No. 12, Dec. 2005.
Japanese Office Action issued on Mar. 11, 2014 in corresponding Japanese Application No. 2011-065021, along with English translation thereof.

* cited by examiner

*Primary Examiner* — Seung C Sohn
(74) *Attorney, Agent, or Firm* — White & Case LLP (57) ABSTRACT

According to one embodiment, a circuit comprises a first resistor configured to have one end to which a first voltage is input and the other end which outputs a second voltage and a first amplifier configured to have an inverting input connected to the other end of the first resistor and a noninverting input to which a third voltage is input. The circuit further comprises a first capacitor configured to have one end to which an output of the first amplifier is input and the other end to which the other end of the first resistor is connected. An output of the first amplifier or an output of a second amplifier connected to the other end of the first resistor is a fourth voltage. In the circuit, the first resistor and a mirror capacitance composed of the first capacitor and the first amplifier constitute a low-pass filter.

20 Claims, 7 Drawing Sheets

VOLTAGE OUTPUT CIRCUIT, CONNECTOR MODULE, AND ACTIVE CABLE

CROSS-REFERENCE TO RELATED APPLICATIONS

This application is based upon and claims the benefit of priority from prior Japanese Patent Application No. 2011-065021, filed Mar. 23, 2011, the entire contents of which are incorporated herein by reference.

FIELD

Embodiments described herein relate generally to a voltage output circuit, an optical receiver module, and an active cable.

BACKGROUND

In an optical receiver that converts an optical signal into a voltage signal, when a photodetector (photodiode) outputs current, the output voltage of the optical receiver might be clipped by the bias current of the photodetector. To avoid this problem, a transimpedance amplifier (TIA) of the optical receiver requires a DC offset cancel (DCOC) function. At the same time, the amplifier also requires the function of current-based conversion of a single-phase signal into a differential signal.

To realize the aforementioned functions, various methods have been considered. Those methods, however, have the problems of increasing not only the area of the optical receiver but also the energy consumption.

DETAILED DESCRIPTION

In general, according to one embodiment, a voltage output circuit comprises a first resistor configured to have one end to which a first voltage is input and the other end which outputs a second voltage and a first amplifier configured to have an inverting input terminal connected to the other end of the first resistor and a noninverting input terminal to which a third voltage is input. In addition, the voltage output circuit further comprises a first capacitor configured to have one end to which an output of the first amplifier is input and the other end to which the other end of the first resistor is connected. An output of the first amplifier or an output of a second amplifier connected to the other end of the first resistor is a fourth voltage, an integration value of the first voltage. In the voltage output circuit, the first resistor and a mirror capacitance composed of the first capacitor and the first amplifier constitute a low-pass filter.

Hereinafter, embodiments will be explained in detail with reference to the accompanying drawings. Like parts are shown by corresponding reference symbols throughout all the drawings. In each of the embodiments below, an explanation will be given taking an active cable with an optical receiver as an example.

First Embodiment

Overview of Optical Cable

Figure 1:
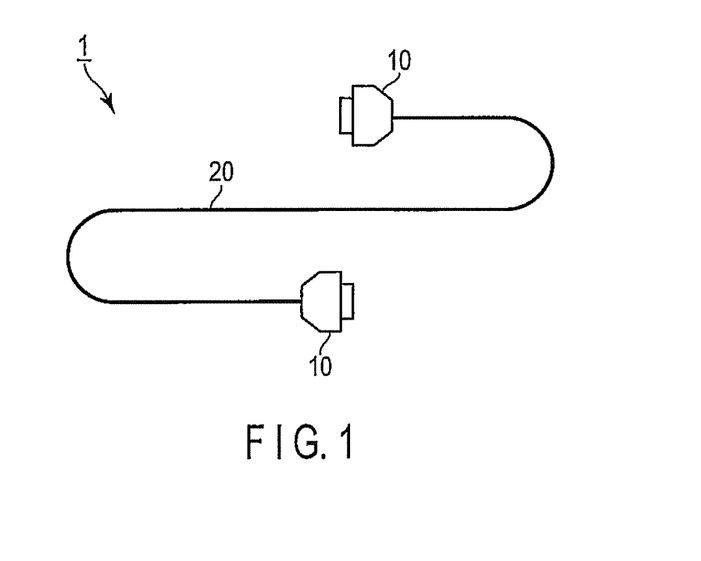
FIG. 1 schematically shows a basic configuration of an active cable according to a first embodiment.

A basic configuration of an active cable according to a first embodiment will be explained roughly. FIG. 1 schematically shows a basic configuration of the active cable according to the first embodiment.

As shown in FIG. 1, the active cable (optical cable) comprises two connector modules (connector/module [C/M]) 10 and an optical fiber cable 20 to both ends of which the connector modules 10 are connected. In each of the two connector modules 10, an optical receiver module (explained later) composed of a light-receiving element that converts an optical signal into a current signal and an optical receiver that converts a current signal into a voltage signal, an optical transmitter (not shown) that converts electricity into light, and others are incorporated. At this time, the active cable allows two-way communication.

An arbitrary electrical signal is supplied to one of the connector modules 10. The electrical signal is converted into an optical signal by the optical transmitter in the connector module 10. Then, the optical signal passes through the optical fiber cable 20 and reaches the other connector module. The optical signal is converted into an electrical signal by the optical receiver. Communication in the reverse direction can also be performed.

The optical fiber cable can be used for one-way communication. In that case, one of the two connector modules 10 includes an optical transmitter and the other includes an optical receiver.

<Configuration of Connector Module>

Figure 2:
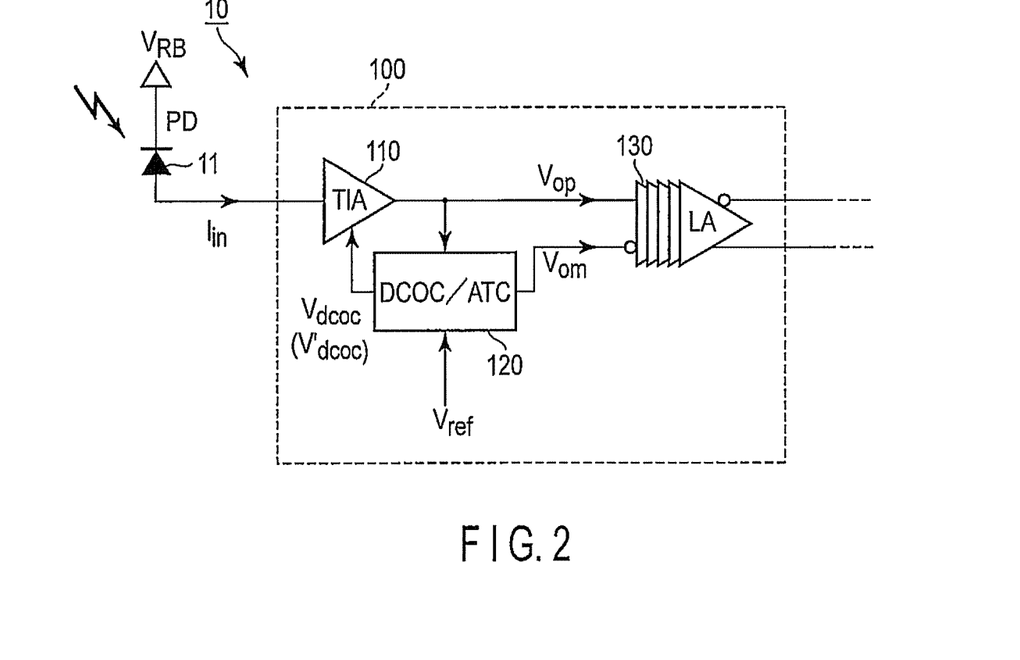
FIG. 2 is a block diagram schematically showing a basic configuration of an optical receiver according to the first embodiment.

Next, the optical receiver 100 in the connector module 10 will be explained briefly with reference to FIG. 2. FIG. 2 is a block diagram schematically showing the optical receiver 100 of the first embodiment.

As shown in FIG. 2, the optical receiver 100 comprises a transimpedance amplifier 110, an average integral voltage output circuit 120, and a limiter amplifier 130.

As shown in FIG. 2, a photodiode 11 converts an optical signal input via the optical fiber cable 20 into an electrical signal corresponding to the strength of the optical signal and supplies an input current $I_{in}$.

The transimpedance amplifier 110 converts the input current $I_{in}$ into an input voltage $V_{op}$. At this time, the transimpedance amplifier 110 reduces a direct-current component of the input current $I_{in}$ on the basis of an integral voltage $V_{dcoc}$ supplied from the average integral voltage output circuit 120. That is, the transimpedance amplifier 110 performs DC offset cancel on the input current $I_{in}$, thereby eliminating a fluctuation in the bias voltage of the input voltage $V_{op}$ caused by a fluctuation in the bias current of the input current $I_{in}$.

The average integral voltage output circuit 120 generates an integral voltage $V_{dcoc}$ and an average voltage $V_{om}$ of the input voltage $V_{op}$ on the basis of the input voltage $V_{op}$ and reference voltage $V_{ref}$.

The limiter amplifier 130 performs a single-phase differential conversion using the input voltage $V_{op}$ and average voltage $V_{om}$.

With this configuration, a negative feedback is applied so as to cause the bias voltage of voltage $V_{op}$ to almost coincide with reference voltage $V_{ref}$.

<Configuration of Average Integral Voltage Output Circuit>

Figure 3:
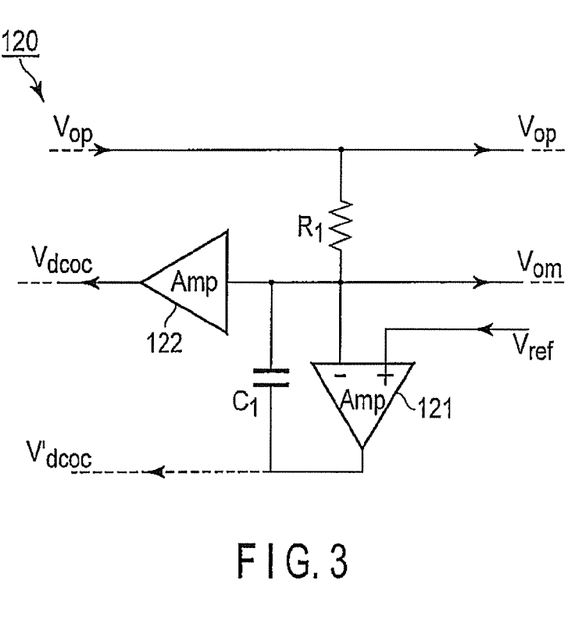
FIG. 3 is a circuit diagram schematically showing a basic configuration of an average integral voltage output circuit according to the first embodiment.

Next, a configuration of the average integral voltage output circuit 120 in the optical receiver 100 will be explained with reference to FIG. 3. FIG. 3 is a circuit diagram schematically showing a configuration of the average integral voltage output circuit 120 according to the first embodiment.

As shown in FIG. 3, the average integral voltage output circuit 120 comprises a resistor $R_1$, a capacitor $C_1$, an operational amplifier (referred to simply as an amplifier or amp) 121, and an amplifier 122.

A voltage $V_{op}$ is applied to one end of resistor $R_1$. The other end of resistor $R_1$ is connected to one electrode of capacitor $C_1$, the inverting input terminal (−) of the operational amplifier 121 and the input terminal of the amplifier 122.

A reference voltage $V_{ref}$ is input to the noninverting input terminal of the operational amplifier 121. The operational amplifier 121 compares the voltage at the inverting input terminal and that at the noninverting input terminal and amplifies the resulting voltage and outputs the comparison result. Hereinafter, let the direct-current gain of the operational amplifier 121 be $A_{dc}$ (greater than 1).

The output of the operational amplifier 121 is supplied to the other electrode of capacitor $C_1$. The amplifier 122 amplifies the voltage at the input terminal. Hereinafter, suppose the direct-current gain is greater than $A_0$ (greater than 1).

With this configuration, resistor $R_1$, capacitor $C_1$, and operational amplifier 121 constitute an integration circuit. A mirror capacitance $C_{mirror}$ of $C_1 \cdot (1+A_{dc})$ appears at the inverting input terminal of the operational amplifier 121 as a result of an mirror effect. Accordingly, the mirror capacitance $C_{mirror}$ and resistor $R_1$ constitute a low-pass filter LPF.

Then, the average integral voltage output circuit 120 outputs a voltage at the other end of resistor $R_1$ (i.e., one electrode of capacitor $C_1$, the inverting input terminal of the operational amplifier 121, and the input terminal of the amplifier 122) as a voltage $V_{om}$. In addition, the average integral voltage output circuit 120 outputs the amplification result of the amplifier 122 as a voltage $V_{dcoc}$.

An integral voltage $V'_{dcoc}$ may be output from the noninverting output terminal (+) of the operational amplifier 121 to the DC offset cancel module of the transimpedance amplifier 110. Hereinafter, suppose the polarity of the integral voltage $V'_{dcoc}$ is the opposite of that of the integral voltage $V_{dcoc}$.

<Operation of Average Integral Voltage Output Circuit>

Next, an operation of the average integral voltage output circuit 120 of the optical receiver 100 will be explained with reference to FIG. 4. A transfer function is represented as Vout/Vin=K(1/1+sτ). K is a gain of a transit area, s is a Laplace transform variable, and τ is a time constant. An angular frequency $\omega_c$ at this time is $\omega_c = 1/\tau$.

Figure 4:
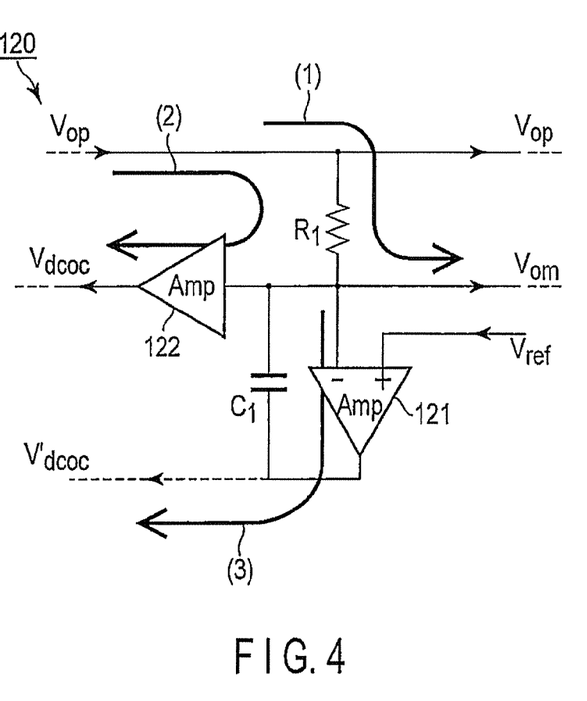
FIG. 4 is a circuit diagram schematically showing a basic operation of the average integral voltage output circuit according to the first embodiment.

As shown in FIG. 4, a transfer characteristic from an input voltage $V_{op}$ to a voltage $V_{om}$ is expressed as $V_{om}/V_{op} = 1/\{1+s(1+A_{dc})C_1R_1\}$. With this transfer characteristic, resistor $R_1$, operational amplifier 121, and capacitor $C_1$ constitute a low-pass filter (LPF) with a time constant of $(1+A_{dc})C_1R_1 (=\tau)$ (see the arrow shown by (1) in FIG. 4). Therefore, the voltage $V_{om}$ is the average voltage of the input voltage $V_{op}$ (hereinafter, referred to simply as average voltage $V_{om}$).

Next, a transfer characteristic from an input voltage $V_{op}$ to an integral voltage $V_{dcoc}$ is expressed as $V_{dcoc}/V_{op} = A_0/\{1+s(1+A_{dc})C_1R_1\}$ (see the arrow shown by (2) in FIG. 4). If $A_0$, $A_{dc} \gg 1$, it follows that $V_{dcoc}/V_{op} \approx 1/\{sA_{dc}C_1R_1/A_0\}$. Therefore, the average integral voltage output circuit 120 can realize an integrator with a unit gain angular frequency of $\omega = A_0/(A_{dc}C_1R_1)$.

In addition, a transfer characteristic from an input voltage $V_{op}$ to an integral voltage $V'_{dcoc}$ is expressed as $V'_{dcoc}/V_{op} = -1/\{sC_1R_1\}$ (see the arrow shown by (3) in FIG. 4).

As described above, in the average integral voltage output circuit 120, the voltage at the inverting input terminal (−), a virtual ground point, of the operational amplifier 121 is the average voltage $V_{om}$ of the input voltage $V_{op}$. The voltage at the inverting input terminal (−) passes through an amplifier with an arbitrary gain, producing an integral voltage $V_{dcoc}$. At this time, capacitor $C_1$ and amplifier 121 constitute a mirror capacitance of $(A_{dc} \times C_1)$. Accordingly, with this configuration, only resistor $R_1$, capacitor $C_1$, operational amplifier 121, and amplifier 122 can realize the low-pass filter function and the DC offset cancel function.

<Operational Advantage of Average Integral Voltage Output Circuit>

According to the first embodiment, the average integral voltage output circuit (voltage output circuit) 120 comprises resistor $R_1$ to one end of which the input voltage $V_{op}$ is input and the other end of which outputs the average voltage $V_{om}$ of the input voltage $V_{op}$, the first operational amplifier 121 whose inverting input terminal is connected to the other end of resistor $R_1$ and to whose noninverting input terminal the reference voltage $V_{ref}$ is input, and capacitor $C_1$ to one end of which the output from the first operational amplifier 121 is input and to the other end of which the other end of resistor $R_1$ is connected. The output of the first amplifier 121 or the output of the second amplifier 122 connected to the other end of resistor $R_1$ is a fourth voltage $V_{dcoc}$ (or $V'_{dcoc}$), an integration value of the first voltage $V_{op}$. The mirror capacitance constituted of capacitor $C_1$ and the first amplifier 121 and resistor $R_1$ constitute a low-pass filter.

This makes it possible to produce an integral voltage $V_{dcoc}$ and an average voltage $V_{om}$ in one path, enabling the area to be made smaller. When passive elements, such as resistors or capacitors, are provided on an integrated circuit, they generally occupy a very large area and cause the problem of increasing costs. However, use of the average integral voltage output circuit 120 of the first embodiment can solve the problem.

Furthermore, the capacitance C of capacitor $C_1$ seems to be virtually multiplied by $(1+A_{dc})$. Therefore, to realize a low unit angular frequency or a large time constant, the capacitance of capacitor $C_1$ can be made smaller and therefore the cost can be reduced.

As a result, it is possible to provide a voltage output circuit that can reduce the area and energy consumption and perform a single-phase differential conversion with high accuracy.

Although not shown, it may be preferable to insert an arbitrary capacitance between the terminal of the average voltage $V_{om}$ and the ground terminal. This is attributable to a finite gain-bandwidth product of the operational amplifier. That is, the reason for the insertion is that the slope of a decrease in the gain of a low-pass filter (e.g., −20 dB/dec) can be achieved effectively even at such a frequency as prevents the effect of the mirror capacitance constituted of the operational amplifier and the capacitor. This makes it possible to convert the integral $V_{dcoc}$ and average voltage $V_{om}$ into a high-accuracy integral voltage and average voltage corresponding to the input voltage $V_{op}$, respectively.

Second Embodiment

Figure 5:
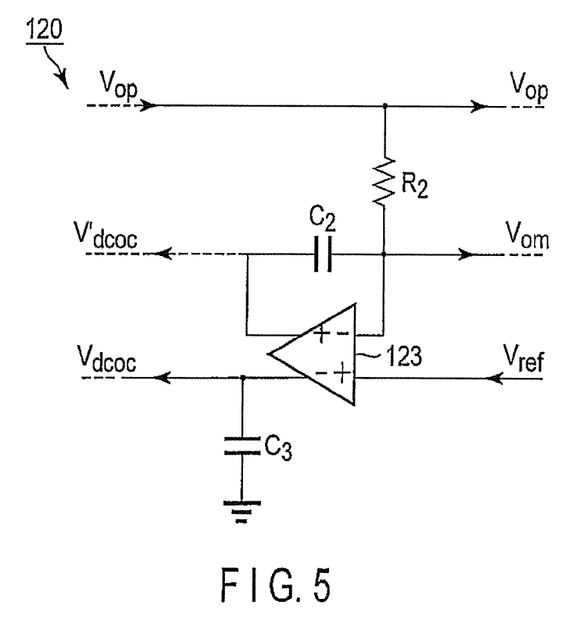
FIG. 5 is a circuit diagram schematically showing a basic configuration of an average integral voltage output circuit according to a second embodiment.

Next, a configuration of an average integral voltage output circuit 120 according to a second embodiment will be explained with reference to FIG. 5. FIG. 5 is a circuit diagram schematically showing a configuration of the average integral voltage output circuit 120 according to the second embodiment. The basic configuration and basic operation are the same as in the first embodiment. Therefore, an explanation of what can be easily considered from what has been explained in the first embodiment and the aforementioned embodiments will be omitted. The second embodiment mainly differs from the first embodiment in that the amplifiers are eliminated and the operational amplifiers are replaced with those of the fully differential type.

<Configuration of Second Average Integral Voltage Output Circuit>

As shown in FIG. 5, the average integral voltage output circuit 120 comprises a resistor $R_2$, capacitors $C_2$, $C_3$, and an operational amplifier 123.

A voltage $V_{op}$ is applied to one end of resistor $R_2$. The other end of resistor $R_2$ is connected to one electrode of capacitor $C_2$ and the inverting input terminal (−) of the operational amplifier 123.

A reference voltage $V_{ref}$ is input to the noninverting input terminal (+) of the operational amplifier 123. The operational amplifier 123 compares the voltage at the inverting input terminal with the voltage at the noninverting input terminal, amplifies the resulting voltage, and outputs the comparison result. Hereinafter, let the direct-current gain of the operational amplifier 123 be $A_{dc}$.

The noninverted output (+) of the operational amplifier 123 is supplied to the other electrode of capacitor $C_2$.

The inverted output (−) of the operational amplifier 123 is supplied to one electrode of capacitor $C_3$. The ground potential (Vss) is applied to the other electrode of capacitor $C_3$.

In the above configuration, resistor $R_2$, capacitor $C_2$, and operational amplifier 123 constitute an integration circuit. At the inverting input terminal of the operational amplifier 123, a mirror capacitance $C_{mirror}$ of $C_2 \cdot (1+A_{dc})$ appears as a result of mirror effects. Therefore, the mirror capacitance $C_{mirror}$ and resistor $R_2$ constitute a low-pass filter LPF.

The noninverted output terminal (+) of the operational amplifier 123 may output an integral voltage $V'_{dcoc}$ to the DC offset cancel module of the transimpedance amplifier 110.

<Operation of Second Average Integral Voltage Output Circuit>

Next, an operation of the average integral voltage output circuit 120 of the optical receiver 100 will be explained with reference to FIG. 6.

Figure 6:
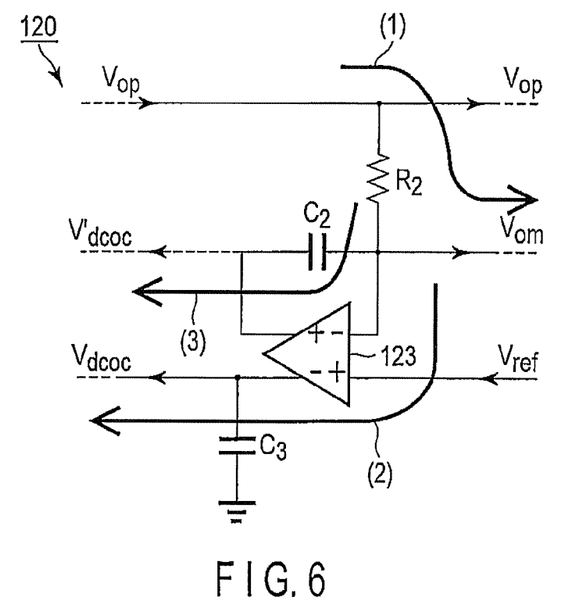
FIG. 6 is a circuit diagram schematically showing a basic operation of the average integral voltage output circuit according to the second embodiment.

As shown in FIG. 6, the average integral voltage output circuit 120 generates an average voltage $V_{om}$ and an integral voltage $V_{dcoc}$ on the basis of the input voltage $V_{op}$ supplied from the transimpedance amplifier 110.

A transfer characteristic from the input voltage $V_{op}$ to the average voltage $V_{om}$ is expressed as $V_{om}/V_{op}=1/\{1+s(1+A_{dc})C_2R_2\}$ on the basis of mirror effects produced by capacitor $C_2$ and operational amplifier 123. Therefore, resistor $R_2$, operational amplifier 123, and capacitor $C_2$ constitute a low-pass filter with a time constant of $(1+A_{dc})C_2R_2$ $(=\tau)$ (see the arrow shown by (1) in FIG. 6).

Next, a transfer characteristic from the input voltage $V_{op}$ to the integral voltage $V_{dcoc}$ is expressed as $V_{dcoc}/V_{op}=1/\{sC_2R_2\}$, which is a characteristic of an integrator (see the arrow shown by (2) in FIG. 6). Here, suppose the gain $A_{dc}$ of the operational amplifier 123 satisfies the expression $A_{dc} \gg 1$.

In addition, a transfer characteristic from the input voltage $V_{op}$ to the integral voltage $V'_{dcoc}$ is expressed as $V'_{dcoc}/V_{op}=-1/\{sC_2R_2\}$ (see the arrow shown by (3) in FIG. 6).

As described above, in the average integral voltage output circuit 120, the voltage at the inverting input terminal (−), a virtual ground point, of the operational amplifier 123 is the average voltage $V_{om}$ of the input voltage $V_{op}$. The average voltage $V_{om}$ passes through the operational amplifier 123, which produces an integral voltage $V_{dcoc}$. At this time, capacitor $C_2$ and amplifier 123 constitute a mirror capacitance. Therefore, with this configuration, resistor $R_2$, capacitor $C_2$, and operational amplifier 123 can realize the low-pass filter function and the DC offset cancel function at the same time.

Capacitor $C_3$, which is an additional (optional) capacitor, is used to improve the common-mode rejection ratio (CMRR) by equalizing load conditions for the differential outputs (+) and (−).

<Operational Advantage of Second Average Integral Voltage Output Circuit>

Since the number of amplifiers used in the second embodiment is one less than in the first embodiment, the second embodiment can reduce energy consumption more than the first embodiment. The operational amplifier is of the fully differential type and therefore the symmetry of the relationship between the differential input/output terminals (between input and output +/−) is good. Accordingly, the CMRR is better than in the first embodiment. Therefore, it is possible to set the bias voltage of the input voltage $V_{op}$ to an arbitrary reference voltage $V_{ref}$ accurately.

As a result, it is possible to provide a voltage output circuit that can reduce the area and energy consumption and perform a single-phase differential conversion with high accuracy.

Although not shown, as in the first embodiment, the integral voltage $V_{dcoc}$ and average voltage $V_{om}$ may be converted into a high-accuracy integral voltage and average voltage corresponding to the input voltage $V_{op}$ respectively by inserting an arbitrary capacitance between the terminal of the average voltage $V_{om}$ and the ground terminal.

Third Embodiment

Figure 7:
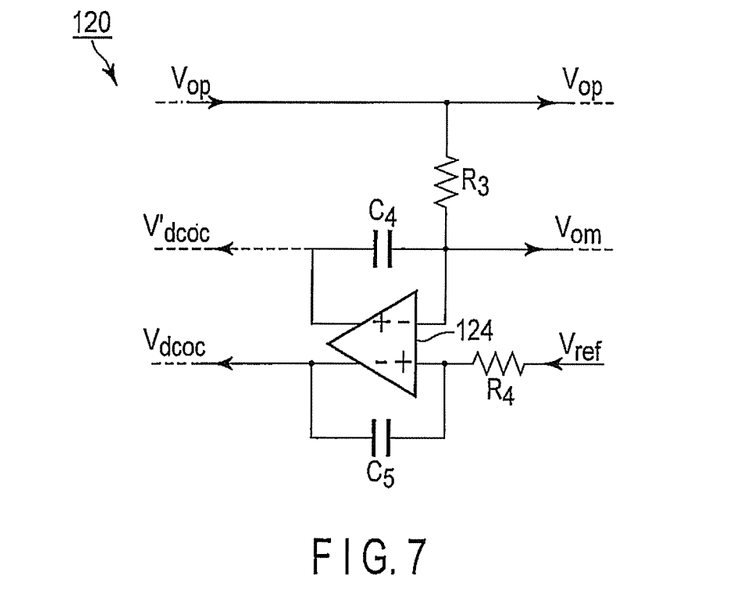
FIG. 7 is a circuit diagram schematically showing a basic configuration of an average integral voltage output circuit according to a third embodiment.

Next, a configuration of an average integral voltage output circuit 120 according to a third embodiment will be explained with reference to FIG. 7. FIG. 7 is a circuit diagram schematically showing a configuration of the average integral voltage output circuit 120 according to the third embodiment. The basic configuration and basic operation are the same as in the first and second embodiments. Therefore, an explanation of what can be easily considered from what has been explained in the first and second embodiments and the aforementioned embodiments will be omitted. The third embodiment mainly differs from the second embodiment in that a resistor is added.

<Configuration of Third Average Integral Voltage Output Circuit>

As shown in FIG. 7, the average integral voltage output circuit 120 comprises resistors $R_3$, $R_4$, capacitors $C_4$, $C_5$, and an operational amplifier 124.

A voltage $V_{op}$ is applied to one end of resistor $R_3$. The other end of resistor $R_3$ is connected to one electrode of capacitor $C_4$ and the inverting input terminal (−) of the operational amplifier 124.

A reference voltage $V_{ref}$ is applied to one end of resistor $R_4$. The other end of resistor $R_4$ is connected to one electrode of capacitor $C_5$ and the noninverting input terminal (+) of the operational amplifier 124.

The operational amplifier 124 compares the voltage at the inverting input terminal with the voltage at the noninverting input terminal, amplifies the resulting voltage, and outputs the comparison result. Hereinafter, let the direct-current gain of the operational amplifier 124 be $A_{dc}$.

The noninverted output (+) of the operational amplifier 124 is supplied to the other electrode of capacitor $C_4$.

The inverted output (−) of the operational amplifier 124 is supplied to the other electrode of capacitor $C_5$.

In the above configuration, resistor $R_3$, capacitor $C_4$, and operational amplifier 124 constitute an integration circuit. At the inverting input terminal of the operational amplifier 124, a mirror capacitance $C_{mirror}$ of $C_4 \cdot (1+A_{dc})$ appears as a result of mirror effects. Therefore, the mirror capacitance $C_{mirror}$ and resistor $R_3$ constitute a low-pass filter LPF.

The noninverted output terminal (+) of the operational amplifier 124 may output an integral voltage $V'_{dcoc}$ to the DC offset cancel module of the transimpedance amplifier 110.

<Operation of Third Average Integral Voltage Output Circuit>

Next, an operation of the average integral voltage output circuit 120 of the optical receiver 100 will be explained with reference to FIG. 8.

Figure 8:
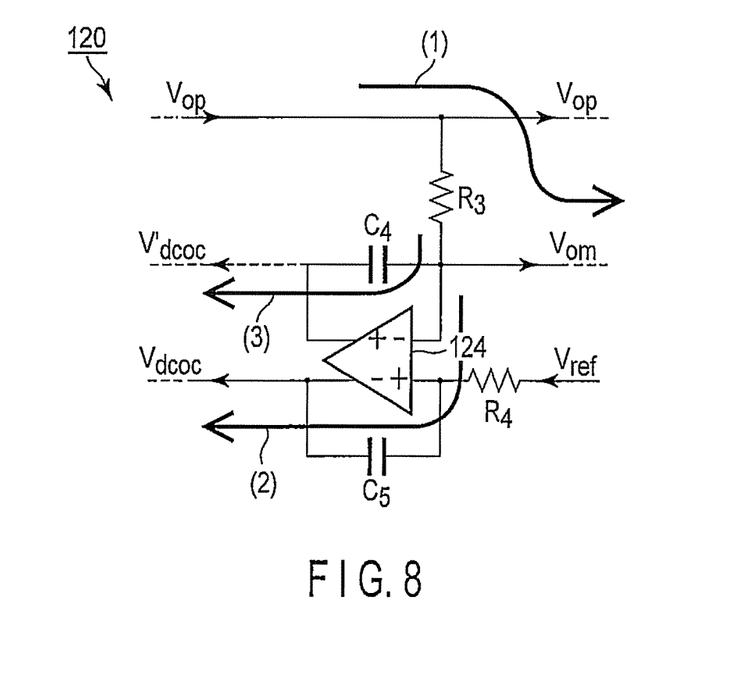
FIG. 8 is a circuit diagram schematically showing a basic operation of the average integral voltage output circuit according to the third embodiment.

As shown in FIG. 8, the average integral voltage output circuit 120 generates an average voltage $V_{om}$ and integral voltages $V_{dcoc}$ and $V'_{dcoc}$ on the basis of the input voltage $V_{op}$ supplied from the transimpedance amplifier 110.

A transfer characteristic from the input voltage $V_{op}$ to the average voltage $V_{om}$ is expressed as $V_{om}/V_{op}=1/\{1+s(1+A_{dc})C_4R_3\}$ on the basis of mirror effects produced by capacitor $C_4$ and operational amplifier 124. Therefore, resistor $R_3$, operational amplifier 124, and capacitor $C_4$ constitute a low-pass filter with a time constant of $(1+A_{dc})C_4R_3$ (=τ) (see the arrow shown by (1) in FIG. 8).

Next, a transfer characteristic from the input voltage $V_{op}$ to the integral voltage $V_{dcoc}$ is expressed as $V_{dcoc}/V_{op}=1/\{sC_4R_3\}$, which is a characteristic of an integrator (see the arrow shown by (2) in FIG. 8). Here, suppose the gain $A_{dc}$ of the operational amplifier 124 satisfies the expression $A_{dc} \gg 1$.

In addition, a transfer characteristic from the input voltage $V_{op}$ to the integral voltage $V'_{dcoc}$ is expressed as $V'_{dcoc}/V_{op}=-1/\{sC_4R_3\}$ (see the arrow shown by (3) in FIG. 8).

As described above, in the average integral voltage output circuit 120, the voltage at the inverting input terminal (−), a virtual ground point, of the operational amplifier 124 is the average voltage $V_{om}$ of the input voltage $V_{op}$. The average voltage $V_{om}$ passes through the operational amplifier 124, which produces an integral voltage $V_{dcoc}$. At this time, capacitor $C_4$ and amplifier 124 constitute a mirror capacitance. Therefore, with this configuration, resistors $R_3$, $R_4$, capacitors $C_4$, $C_5$, and operational amplifier 124 can realize the low-pass filter function and the DC offset cancel function at the same time.

<Operational Advantage of Third Average Integral Voltage Output Circuit>

In the third embodiment, resistor $R_4$ is added as compared with the second embodiment. This results in an increase in the area. However, the effect of the mirror capacitance helps suppress the magnitude of capacitors. In addition, the symmetry around the operational amplifier improves, making the CMRR better, which improves the accuracy.

As a result, it is possible to provide a voltage output circuit that can reduce the area and energy consumption and perform a single-phase differential conversion with high accuracy.

Although not shown, as in the first embodiment, the integral voltage $V_{dcoc}$ and average voltage $V_{om}$ may be converted into a high-accuracy integral voltage and average voltage corresponding to the input voltage $V_{op}$ respectively by inserting an arbitrary capacitance between the terminal of the average voltage $V_{om}$ and the ground terminal.

Fourth Embodiment

Figure 9:
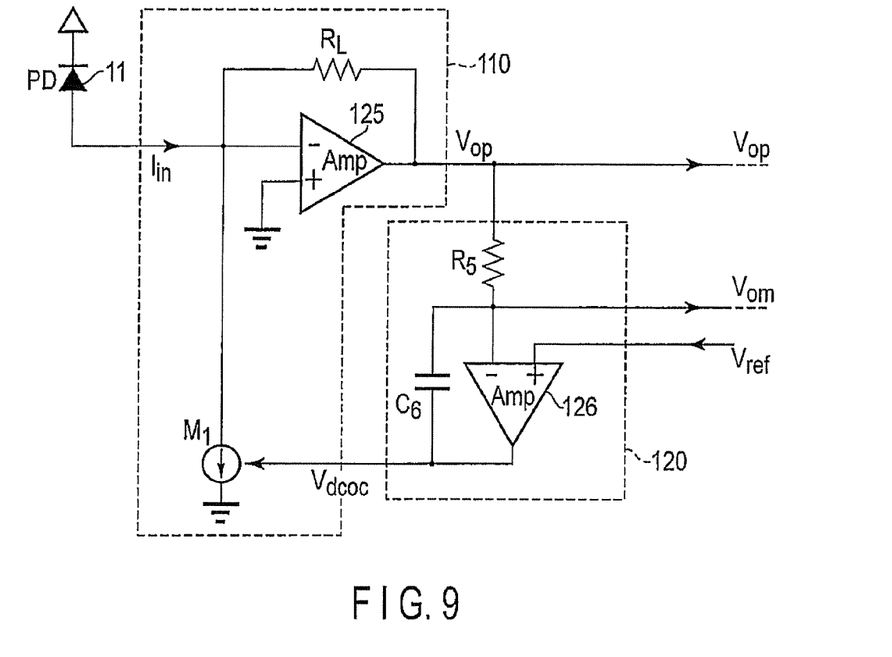
FIG. 9 is a circuit diagram schematically showing a basic configuration of a transimpedance amplifier and an average integral voltage output circuit according to a fourth embodiment.

Next, a configuration of a transimpedance amplifier 110 and an average integral voltage output circuit 120 according to a fourth embodiment will be explained with reference to FIG. 9. FIG. 9 is a circuit diagram schematically showing a configuration of the transimpedance amplifier 110 and average integral voltage output circuit 120 according to the fourth embodiment. The basic configuration and basic operation are the same as in the first embodiment. Therefore, an explanation of what can be easily considered from what has been explained in the first embodiment and the aforementioned embodiments will be omitted.

<Configuration of Transimpedance Amplifier And Average Integral Voltage Output Circuit>

As shown in FIG. 9, the transimpedance amplifier 110 comprises an operational amplifier 125, a resistor $R_L$, and a voltage-to-current converter $M_1$.

An input current $I_{in}$ is input to the inverting input terminal (−) of the operational amplifier 125. The ground potential is applied to the noninverting input terminal (+) of the operational amplifier 125. The operational amplifier 125 compares the voltage at the inverting input terminal with the voltage at the noninverting input terminal, amplifies the resulting voltage, and outputs the comparison result.

The inverting input terminal (−) of the operational amplifier 125 is connected to one end of resistor $R_L$. The other end of resistor $R_L$ is connected to the output terminal of the operational amplifier 125 and the average integral voltage output circuit 120.

The inverting input terminal (−) of the operational amplifier 125 is connected to one end of the voltage-to-current converter $M_1$. The other end of the voltage-to-current converter $M_1$ is connected to the ground potential. The average integral voltage output circuit 120 inputs an integral voltage $V_{dcoc}$ to the voltage-to-current converter $M_1$. The voltage-to-current converter $M_1$ decreases the direct-current component of the input current $I_{in}$ on the basis of the integral voltage $V_{dcoc}$.

The average integral voltage output circuit 120 comprises a resistor $R_5$, an operational amplifier 126, and a capacitor $C_6$.

A voltage $V_{op}$ is applied to one end of resistor $R_5$. The other end of resistor $R_5$ is connected to one electrode of capacitor $C_6$ and the inverting input terminal (−) of the operational amplifier 126.

A reference voltage $V_{ref}$ is input to the noninverting input terminal (+) of the operational amplifier 126. The operational amplifier 126 compares the voltage at the inverting input terminal with the voltage at the noninverting input terminal, amplifies the resulting voltage, and outputs the comparison result. Hereinafter, let the direct-current gain of the operational amplifier 126 be $A_{dc}$.

The output of the operational amplifier 126 is supplied to the other electrode of capacitor $C_6$.

In the above configuration, resistor $R_5$, capacitor $C_6$, and operational amplifier 126 constitute an integration circuit. At the inverting input terminal of the operational amplifier 126, a mirror capacitance $C_{mirror}$ of $C_6 \cdot (1+A_{dc})$ appears as a result of mirror effects. Therefore, the mirror capacitance $C_{mirror}$ and resistor $R_5$ constitute a low-pass filter LPF.

The average integral voltage output circuit 120 outputs the voltage at the other end of resistor $R_5$ (i.e., at one electrode of capacitor $C_6$ and the inverting input terminal of the operational amplifier 126) as a voltage $V_{dcoc}$.

<Operations of Transimpedance Amplifier And Average Integral Voltage Output Circuit>

Next, operations of the transimpedance amplifier 110 and average integral voltage output circuit 120 will be explained with reference to FIG. 10.

Figure 10:
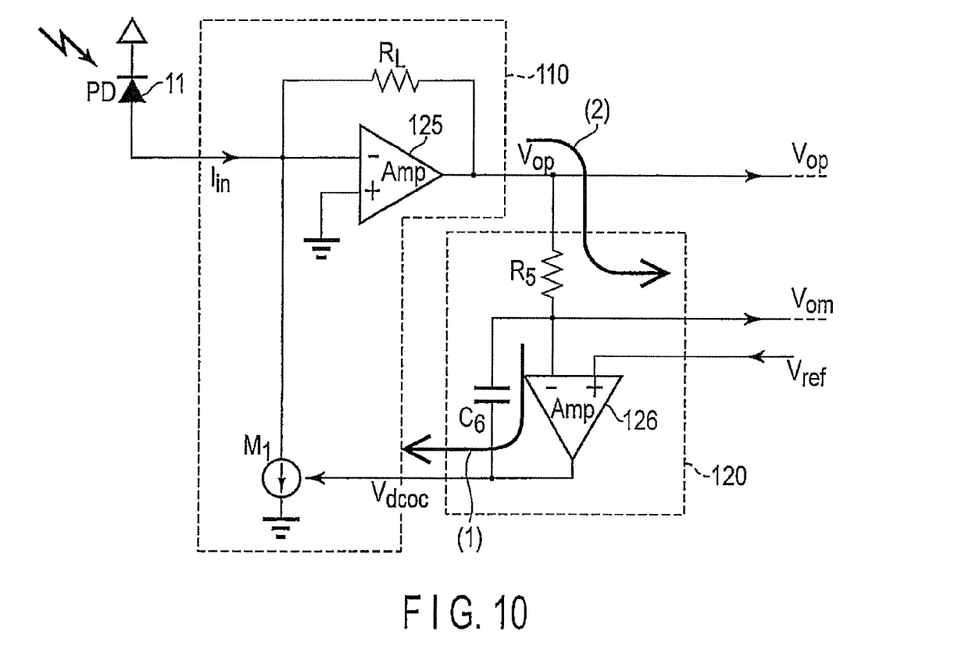
FIG. 10 is a circuit diagram schematically showing a basic operation of the transimpedance amplifier and average integral voltage output circuit according to the fourth embodiment.

As shown in FIG. 10, a combination of the operational amplifier 125 and resistor $R_L$ converts current $I_{in}$ of the photodiode 11 into a voltage $V_{op}$. Its transfer characteristic is expressed as $V_{op}/V_{in}=-R_L$. The output voltage $V_{op}$ is the reverse of $I_{in}$ in polarity.

DC offset cancel in the transimpedance amplifier 110 is performed via the voltage-to-current converter $M_1$ as described below.

Here, suppose the current in the voltage-to-current converter $M_1$ is constant. When the bias current (DC offset) of the input current $I_{in}$ of the photodiode 11 has fluctuated, the bias voltage of the output voltage $V_{op}$ of the transimpedance amplifier 110 also has fluctuated, which might permit the output voltage $V_{op}$ to exceed an intended operating range.

Here, as shown in FIG. 10, the integral voltage $V_{dcoc}$ of the output voltage $V_{op}$ is fed back to the voltage-to-current converter $M_1$ so as to cause the current in the voltage-to-current converter $M_1$ to vary adaptively. Specifically, the average integral voltage output circuit 120 comprises an integrator composed of a resistor $R_5$, a capacitor $C_6$, and an operational amplifier 126. Then, the average integral voltage output circuit 120 outputs to the voltage-to-current converter $M_1$ an integral voltage $V_{dcoc}$ obtained via the integrator that detects and amplifies the direct current component of the output voltage $V_{op}$ (see the arrow shown by (1) in FIG. 10).

As a result, even if an increase in the bias current of the input current $I_{in}$ causes the bias voltage of the output voltage Vop to rise, the integral voltage $V_{dcoc}$ also increases in proportion to the rise in the bias voltage and the voltage-to-current converter $M_1$ operates so as to draw in (or absorb) the bias current of the input current $I_{in}$ (for negative feedback). Consequently, the bias voltage of the output voltage $V_{op}$ converges at the reference voltage $V_{ref}$. Here, a transfer characteristic from $V_{op}$ to $V_{dcoc}$ is expressed as $V_{dcoc}/V_{op}=1/\{sC_5R_6\}$ (an inverting integrator). Here, suppose the gain $A_{dc}$ of the operational amplifier 126 satisfies the expression $A_{dc} \gg 1$.

An example of the flow of the negative feedback is as follows:

i) A rise in the bias current of the input current $I_{in}$ causes the voltage at the inverting input terminal (−) of the amplifier 125 to rise ii) A drop in the bias voltage of the output voltage $V_{op}$ iii) A rise in the integral voltage $V_{dcoc}$ iv) An increase in the current of the voltage-to-current converter $M_1$ v) A drop in the voltage at the inverting input terminal (−) of the amplifier 125

In addition, resistor $R_5$, capacitor $C_6$, and operational amplifier 126 of the average integral voltage output circuit 120 function not only as an integrator but also as a low-pass filter. Therefore, the low-pass filter produces an average voltage $V_{om}$ of the output voltage $V_{op}$ and therefore a limiter amplifier 130 (not shown in FIG. 10) in a subsequent stage performs a single-phase differential conversion accurately (see the arrow shown by (2) in FIG. 10).

<Operational Advantage of the Transimpedance Amplifier And Average Integral Voltage Output Circuit>

According to the fourth embodiment, the transimpedance amplifier 110 comprises a current-to-voltage converter which includes the third operational amplifier 125 which converts the input current $I_{in}$ into the input voltage $V_{op}$ and to the inverting input terminal of which the input current $I_{in}$ is input, and a resistor $R_L$ which is connected between the inverting input terminal and output terminal of the third operational amplifier 125, and the voltage-to-current converter $M_1$ which controls the input current $I_{in}$ on the basis of the integral voltage $V_{dcoc}$.

As described above, when the transimpedance amplifier 110 has an inverted polarity, the polarity of the output voltage $V_{op}$ must be changed to that of the integral voltage $V_{dcoc}$ for the DC offset cancel function. In other words, since the transimpedance amplifier 110 has an inverting characteristic, an inverting integrator must be used also in the feedback path to stabilize the negative feedback of the DC offset cancel.

As described above, even when the transimpedance amplifier 110 with an inversion polarity is used, the same effect as that of the first embodiment can be obtained by using the average integral voltage output circuit 120 explained in the fourth embodiment.

Fifth Embodiment

Figure 11:
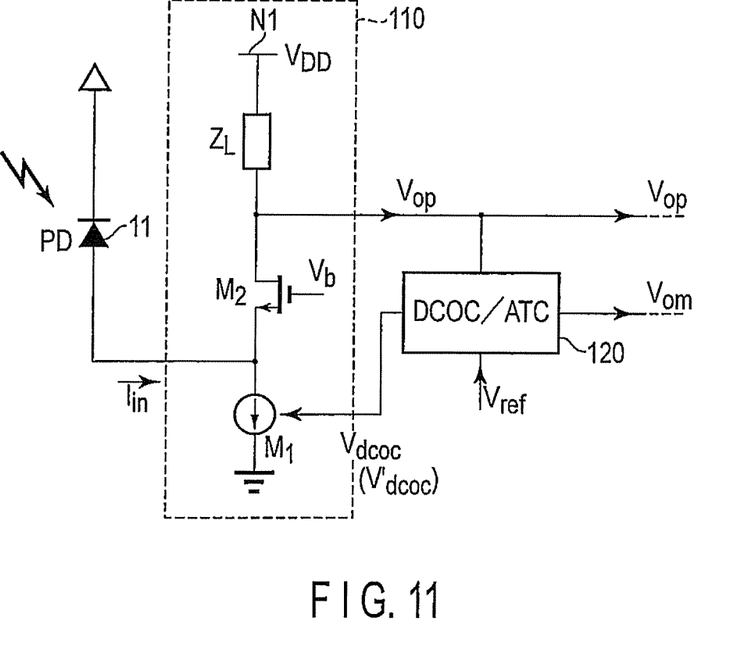
FIG. 11 is a circuit diagram schematically showing a basic configuration of a transimpedance amplifier and an average integral voltage output circuit according to a fifth embodiment.

Next, a configuration of a transimpedance amplifier 110 and an average integral voltage output circuit 120 according to a fifth embodiment will be explained with reference to FIG. 11. FIG. 11 is a circuit diagram schematically showing a configuration of the transimpedance amplifier 110 and average integral voltage output circuit 120 according to the fifth embodiment. The basic configuration and basic operation are the same as in the first to third embodiments. Therefore, an explanation of what can be easily considered from what has been explained in the first to third embodiments and the aforementioned embodiments will be omitted.

<Configuration of Transimpedance Amplifier>

As shown in FIG. 11, the transimpedance amplifier 110 comprises a voltage-to-current converter $M_1$, a MOS transistor $M_2$, and a load $Z_L$.

An input current $I_{in}$ is input to one end of the current path of the voltage-to-current converter $M_1$. The other end of the voltage-to-current converter $M_1$ is connected to the ground potential. An average integral voltage output circuit 120 inputs an integral voltage $V_{dcoc}$ to the voltage-to-current converter $M_1$.

The MOS transistor $M_2$ is an NMOS transistor. The input current $I_{in}$ is input to one end of the current path of the MOS transistor $M_2$. An average integral voltage output circuit 120 is connected to the other end of the current path of the MOS transistor $M_2$. A specific voltage $V_b$ is applied to the gate of the MOS transistor $M_2$.

The other end of the MOS transistor $M_2$ and the average integral voltage output circuit 120 are connected to one end of the current path of the load $Z_L$. The other end of the current path of the load $Z_L$ is connected to node N1 to which a power supply $V_{DD}$ is supplied.

As described above, the transimpedance amplifier 110 is a grounded-gate amplifier composed of the NMOS transistor $M_2$, voltage-to-current converter $M_1$ with an arbitrary conductance, and load $Z_L$.

The average integral voltage output circuit 120 uses the circuit configuration (in FIGS. 3 to 8) explained in the first to third embodiments.

<Operation of Transimpedance Amplifier>

Next, operations of the transimpedance amplifier 110 and average integral voltage output circuit 120 will be explained with reference to FIG. 11.

DC offset cancel in the transimpedance amplifier 110 is performed via the voltage-to-current converter $M_1$.

The integral voltage $V_{dcoc}$ of the output voltage $V_{op}$ is fed back to the voltage-to-current converter $M_1$ so as to cause the current in the voltage-to-current converter $M_1$ to vary adaptively. Specifically, the average integral voltage output circuit 120 outputs to the voltage-to-current converter $M_1$ an integral voltage $V_{dcoc}$ obtained via the integrator that detects and amplifies the direct current component of the output voltage $V_{op}$.

As a result, even if an increase in the bias current of the input current $I_{in}$ causes the bias voltage of the output voltage $V_{op}$ to rise, the integral voltage $V_{dcoc}$ also increases in proportion to the rise in the bias voltage and the voltage-to-current converter $M_1$ operates so as to draw in the bias current of the input current $I_{in}$, suppressing an unexpected rise in the output voltage $V_{op}$. At this time, the bias voltage of the output voltage $V_{op}$ almost coincides with an arbitrary reference voltage $V_{ref}$.

The average integral voltage output circuit 120 also functions as a low-pass filter. Therefore, the low-pass filter produces an average voltage $V_{om}$ of the output voltage $V_{op}$ and therefore a limiter amplifier 130 (not shown in FIG. 10) in a subsequent stage performs a single-phase differential conversion accurately.

<Operational Advantage of the Transimpedance Amplifier>

According to the fifth embodiment, the transimpedance amplifier 110 uses an NMOS transistor as the MOS transistor $M_2$, enabling the MOS transistor $M_2$ to be regarded as an amplifier, which makes it possible to decrease the gain of the amplifier to save electricity.

The configuration of the transimpedance amplifier (or grounded-gate amplifier) explained in the fifth embodiment can be combined with the average integral voltage output circuit 120 in each of the first to third embodiments. Therefore, the same effects as those of the first to third embodiments can be obtained.

Comparative Example 1

Figure 12:
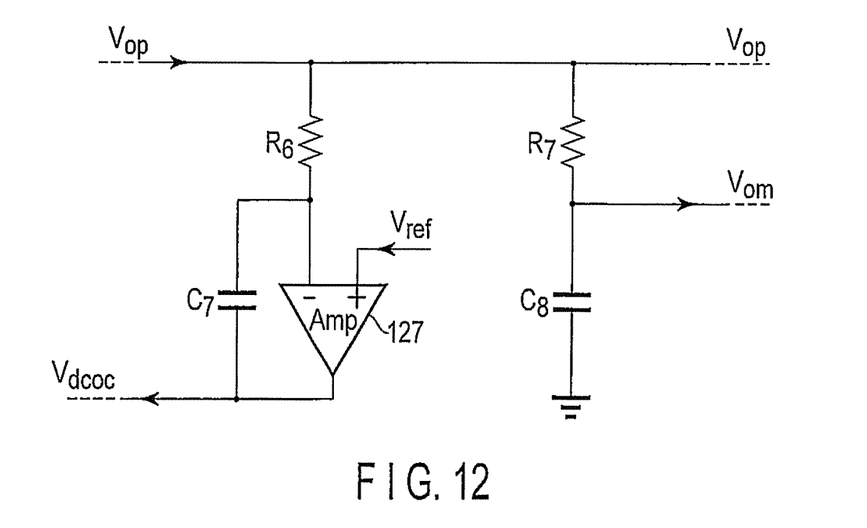
FIG. 12 is a circuit diagram schematically showing a basic configuration of an average integral voltage output circuit according to comparative example 1.

Next, a configuration of an average integral voltage output circuit 120 in comparative example 1 will be explained with reference to FIG. 12. FIG. 12 is a circuit diagram schematically showing a configuration of the average integral voltage output circuit 120 in comparative example 1.

As shown in FIG. 12, the average integral voltage output circuit 120 uses an output voltage $V_{op}$ as an input voltage. The average integral voltage output circuit 120 comprises a circuit (integrator) that outputs an integral voltage $V_{dcoc}$ of the output voltage $V_{op}$ and a circuit (LPF) that outputs an average voltage $V_{om}$ of the output voltage $V_{op}$. The integrator circuit comprises a resistor $R_6$, a capacitor $C_7$, and an operational amplifier 127. The LPF circuit comprises a resistor $R_7$ and a capacitor $C_8$.

A path that outputs the integral voltage $V_{dcoc}$ is used as, for example, a feedback path for DC offset cancel (DCOC). The feedback function causes the bias voltage of $V_{op}$ to be almost equal to the reference voltage $V_{ref}$ applied to the noninverting terminal of the operational amplifier 127. In addition, the average voltage $V_{om}$ is input together with, for example, the output voltage $V_{op}$ to a fully differential amplifier and is used for single-phase differential conversion.

The average integral voltage output circuit 120 obtains the integral voltage $V_{dcoc}$ and average voltage $V_{om}$ via independent paths separately.

As described above, with the configuration of FIG. 12, the desired integral voltage $V_{dcoc}$ and average voltage $V_{om}$ are obtained from the output voltage $V_{op}$. However, the passive elements, including resistors $R_1, R_2$, and capacitors $C_1, C_2$ are generally set to very large invariables and therefore the occupied area on the integrated circuit becomes large, causing the problem of increasing costs.

Comparative Example 2

Figure 13:
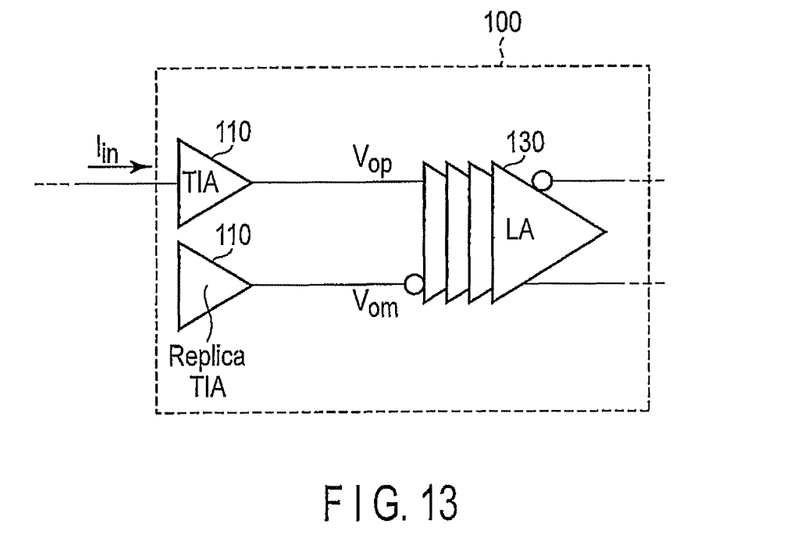
FIG. 13 is a circuit diagram schematically showing a basic configuration of an optical receiver according to comparative example 2.

Next, a configuration of an optical receiver 100 in comparative example 2 will be explained with reference to FIG. 13. FIG. 13 is a circuit diagram schematically showing a configuration of the optical receiver 100 in comparative example 2.

As shown in FIG. 13, the optical receiver 100 comprises a transimpedance amplifier 110, a replica transimpedance amplifier (also referred to as replica TIA) 111 and a limiter amplifier 130.

An input current $I_{in}$ is input to the transimpedance amplifier 110. The transimpedance amplifier 110 outputs an output voltage $V_{op}$.

The replica transimpedance amplifier 111 outputs an average voltage $V_{om}$.

The limiter amplifier 130 performs a single-phase differential conversion using the input voltage $V_{op}$ and average voltage $V_{om}$.

However, use of the integrator for DC offset cancel and the replica TIA for obtaining the output average voltage for the single-phase differential conversion TIA causes the problem of increasing the area and energy consumption. In addition, it is difficult to cause the output voltage $V_{op}$ and the average voltage $V_{om}$ to coincide with each other accurately, which causes the problem of allowing permit jitter to occur at the time of single-phase differential conversion.

The above embodiments have been explained taking an active cable with an optical receiver as an example. However, the aforementioned transimpedance amplifier 110 and average integral voltage output circuit 120 may be applied to suitable cables other than the active cable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without depart-

What is claimed is:

1. A voltage output circuit comprising:
a first resistor configured to have one end to which a first voltage is input and the other end which outputs a second voltage;
a first amplifier configured to have an inverting input terminal connected to the other end of the first resistor and a noninverting input terminal to which a third voltage is input; and
a first capacitor configured to have one end to which an output of the first amplifier is input and the other end to which the other end of the first resistor is connected,
wherein an output of the first amplifier or an output of a second amplifier connected to the other end of the first resistor is a fourth voltage, an integration value of the first voltage, and
the first resistor and a mirror capacitance composed of the first capacitor and the first amplifier constitute a low-pass filter.

2. The voltage output circuit of claim 1, wherein a direct-current gain of the first amplifier is greater than one.

3. The voltage output circuit of claim 1, wherein the polarity of the output of the first amplifier differs from that of the output of the second amplifier connected to the other end of the first resistor.

4. The voltage output circuit of claim 1, further comprising a second capacitor configured to have one end to which the second voltage is input and the other end to which a fifth voltage is input.

5. An optical receiver module comprising:
a voltage output circuit of claim 1;
a photodetector which outputs a received optical signal as a first current;
a transimpedance amplifier which converts the first current into the first voltage and decreases a direct-current component of the first current in proportion to the fourth voltage; and
a differential amplifier which has a noninverting input terminal to which the first voltage is input and an inverting input terminal to which the second voltage is input.

6. The optical receiver module of claim 5, wherein the transimpedance amplifier comprises a current-to-voltage conversion module which converts the first current into the first voltage and a voltage-to-current conversion module which controls the first current according to the fourth voltage.

7. The optical receiver module of claim 6, wherein the current-to-voltage conversion module comprises a third amplifier to whose inverting input terminal the first current is input and a second resistor which is connected between the inverting input terminal and output terminal of the third amplifier.

8. The optical receiver module of claim 6, wherein the current-to-voltage conversion module comprises
a first transistor to one end of whose current path the first current is input and to the other end of whose current path the first resistor is connected, and
a load to one end of whose current path the other end of the first transistor and the first resistor are connected and to the other end of whose current path a fifth voltage is supplied.

9. An active cable comprising:
an optical receiver module of claim 5; and
an optical fiber cable which is connected to the optical receiver module.

10. A voltage output circuit comprising:
a first resistor configured to have one end to which a first voltage is input and the other end which outputs a second voltage;
a first differential amplifier configured to have an inverting input terminal connected to the other end of the first resistor and a noninverting input terminal to which a third voltage is input; and
a first capacitor configured to have one end to which a noninverted output of the first differential amplifier is input and the other end to which the other end of the first resistor is connected,
wherein an inverted output of the first differential amplifier or a noninverted output of the first differential amplifier is a fourth voltage, an integration value of the first voltage, and
the first resistor and a mirror capacitance composed of the first capacitor and the first differential amplifier constitute a low-pass filter.

11. The voltage output circuit of claim 10, further comprising a second capacitor configured to have one end to which a noninverted output of the first differential amplifier is input and the other end to which a fifth voltage is input.

12. The voltage output circuit of claim 11, wherein a direct-current gain of the first differential amplifier is greater than one.

13. The voltage output circuit of claim 11, further comprising a third capacitor configured to have one end to which the second voltage is input and the other end to which a sixth voltage is input.

14. The voltage output circuit of claim 10, further comprising:
a second resistor configured to have one end to which the third voltage is input and the other end connected to the noninverting input terminal of the first differential amplifier; and
a second capacitor configured to have one end connected to the other end of the second resistor and the other end to which the inverted output of the first differential amplifier is input.

15. The voltage output circuit of claim 14, wherein a direct-current gain of the first differential amplifier is greater than one.

16. The voltage output circuit of claim 14, further comprising a third capacitor configured to have one end to which the second voltage is input and the other end to which a fifth voltage is input.

17. An optical receiver module comprising:
a voltage output circuit of claim 10;
a photodetector which outputs a received optical signal as a first current;
a transimpedance amplifier which converts the first current into the first voltage and decreases a direct-current component of the first current in proportion to the fourth voltage; and
a second differential amplifier which has a noninverting input terminal to which the first voltage is input and an inverting input terminal to which the second voltage is input.

18. The optical receiver module of claim 17, wherein the transimpedance amplifier comprises a current-to-voltage conversion module which converts the first current into the first voltage and a voltage-to-current conversion module which controls the first current according to the fourth voltage.

19. The optical receiver module of claim 18, wherein the current-to-voltage conversion module comprises a third amplifier to whose inverting input terminal the first current is input and a second resistor which is connected between the inverting input terminal and output terminal of the third amplifier, or the current-to-voltage conversion module comprises a first transistor to one end of whose current path the first current is input and to the other end of whose current path the first resistor is connected and a load to one end of whose current path the other end of the first transistor and the first resistor are connected and to the other end of whose current path a fifth voltage is supplied.

20. An active cable comprising:
an optical receiver module of claim 17; and
an optical fiber cable connected to the optical receiver module.

* * * * *